(12) United States Patent
Balslink et al.

(10) Patent No.: US 9,823,073 B2
(45) Date of Patent: Nov. 21, 2017

(54) ROTATION-RATE SENSOR HAVING A SUBSTRATE HAVING A MAIN EXTENSION PLANE FOR DETECTING A ROTATION RATE

(71) Applicant: Robert Bosch GmbH, Stuttgart (DE)

(72) Inventors: Thorsten Balslink, Kirchentellinsfurt (DE); Rolf Scheben, Reutlingen (DE); Benjamin Schmidt, Stuttgart (DE); Ralf Ameling, Aalen (DE); Mirko Hattass, Stuttgart (DE); Burkhard Kuhlmann, Reutlingen (DE); Robert Maul, Pforzheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 153 days.

(21) Appl. No.: 14/787,702

(22) PCT Filed: May 14, 2014

(86) PCT No.: PCT/EP2014/059816
§ 371 (c)(1),
(2) Date: Oct. 28, 2015

(87) PCT Pub. No.: WO2014/184225
PCT Pub. Date: Nov. 20, 2014

(65) Prior Publication Data
US 2016/0069682 A1    Mar. 10, 2016

(30) Foreign Application Priority Data

May 14, 2013  (DE) .................. 10 2013 208 817

(51) Int. Cl.
*G01C 19/5747*    (2012.01)
*G01C 19/56*    (2012.01)
(Continued)

(52) U.S. Cl.
CPC ....... *G01C 19/5705* (2013.01); *G01C 19/574* (2013.01); *G01C 19/5719* (2013.01); *G01C 19/5747* (2013.01)

(58) Field of Classification Search
CPC ............ G01C 19/5747; G01C 19/5705; G01C 19/574; G01C 19/5719; G01C 19/5712
See application file for complete search history.

(56) References Cited

U.S. PATENT DOCUMENTS 7,134,337 B2 * 11/2006 Willig ................ G01C 19/5747
                                                    73/504.12
9,081,027 B2 *  7/2015 Neul .................... G01C 19/574
(Continued)

FOREIGN PATENT DOCUMENTS

DE    10 2007 054505    5/2009
DE    10 2010 061755    5/2012
(Continued)

*Primary Examiner* — Helen Kwok
(74) *Attorney, Agent, or Firm* — Norton Rose Fulbright US LLP; Gerard Messina

(57) ABSTRACT

A rotation-rate sensor having a substrate with main extension plane, for detecting a rotation rate, extending in a direction parallel/orthogonal to the main plane; the sensor including a primary/secondary pair of seismic masses; the primary pair having first/second primary masses; the secondary pair having first/second secondary masses; the first/second primary masses being movable relative to the substrate along a primary deflection direction extending parallel to the main plane; the first/second secondary masses being movable relative to the substrate along a secondary deflection direction extending parallel to the main plane; the first/second primary masses and the first/second primary masses being movable antiparallel or parallel to one another corresponding to the deflection direction, essentially extending orthogonally to the secondary deflection direction; and the primary pair and/or secondary pair being drivable so
(Continued)

that, based on sensor rotation, the Coriolis force leads to deflection of the first/second primary masses and/or the first/second secondary masses.

13 Claims, 8 Drawing Sheets

(51) Int. Cl.
*G01C 19/5705* (2012.01)
*G01C 19/574* (2012.01)
*G01C 19/5719* (2012.01)

(56) References Cited

U.S. PATENT DOCUMENTS

| | | | | |
|---|---|---|---|---|
| 2010/0236327 A1* | 9/2010 | Mao | ............ | G01C 19/5719 |
| | | | | 73/504.12 |
| 2011/0185813 A1* | 8/2011 | Classen | ............ | G01C 19/5747 |
| | | | | 73/504.13 |
| 2012/0060604 A1* | 3/2012 | Neul | ............ | G01C 19/574 |
| | | | | 73/504.12 |
| 2012/0061172 A1* | 3/2012 | Yacine | ............ | G01C 19/5747 |
| | | | | 181/121 |
| 2012/0125099 A1* | 5/2012 | Scheben | ............ | G01C 19/5747 |
| | | | | 73/504.12 |
| 2013/0174661 A1* | 7/2013 | Kuhlmann | ............ | G01C 19/56 |
| | | | | 73/504.12 |

FOREIGN PATENT DOCUMENTS

| | | |
|---|---|---|
| WO | WO 2009/107576 | 9/2009 |
| WO | WO 2010/130765 | 11/2010 |

\* cited by examiner

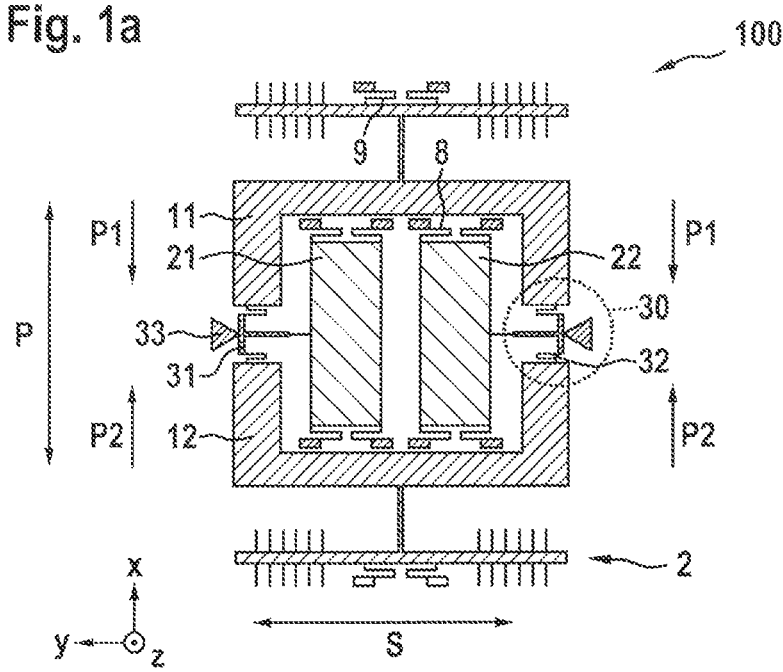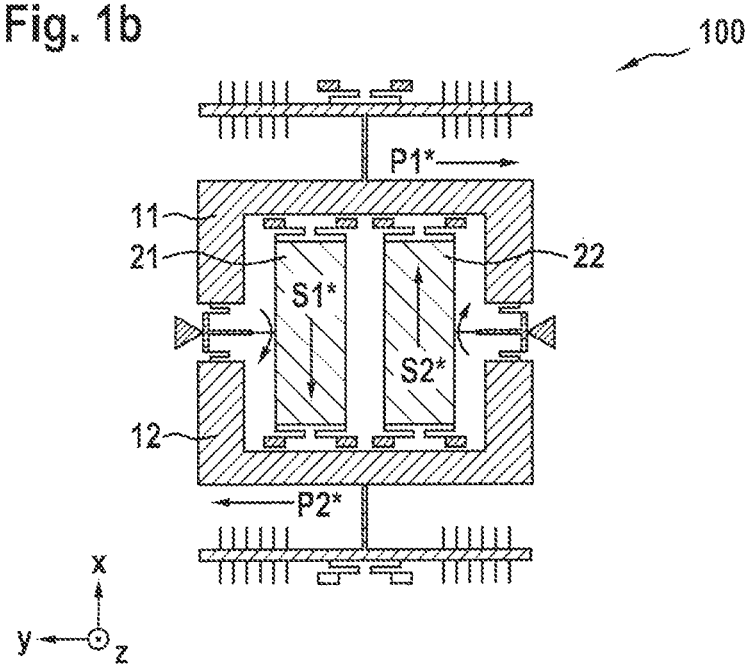

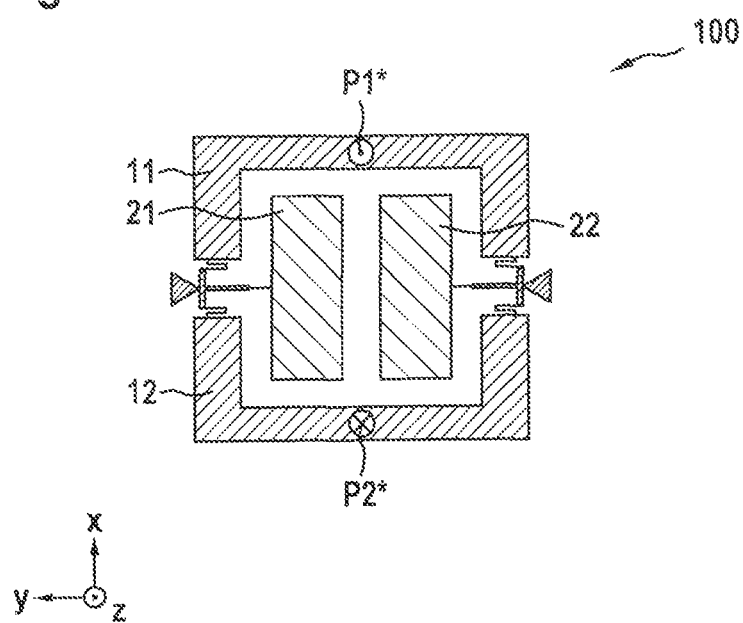

ROTATION-RATE SENSOR HAVING A SUBSTRATE HAVING A MAIN EXTENSION PLANE FOR DETECTING A ROTATION RATE

FIELD OF THE INVENTION

The present invention relates to a rotation-rate sensor.

BACKGROUND INFORMATION

Rotation-rate sensors are known from the related art and are able to determine the rotation rates of a rotary motion. A rotation-rate sensor, which is discussed in publication WO 03064975 A1, for example, that has two oscillatory mass elements (a two-mass system). Such rotation-rate sensors typically have oscillatory masses (partial oscillators) that are driven to an antiparallel mode. If a rotation rate is present, the Coriolis force excites an antiparallel detection oscillation which is measured capacitively and converted by an evaluation electronics into a rotation rate. Under the related art, a partial oscillator is constituted of a drive oscillator and a Coriolis oscillator. The drive oscillator participates only in the drive motion and not in the detection oscillation. The Coriolis element participates both in the drive oscillation and in the detection oscillation. In useful relevant applications, sensors or parts thereof are subject to forces other than the Coriolis force, in particular, inertia forces produced by linear accelerations and by angular accelerations, that can likewise induce a signal, respectively that can corrupt the signal associated with the Coriolis force. When these forces occur, this leads disadvantageously to spurious signals during operation because an angular acceleration, for instance, in the form of a rotational oscillation about the sensitive axis, for example, leads directly to a rotation-rate signal. In particular, if the rotational oscillation occurs at the frequency used to drive the rotation-rate sensor and in phase with a Coriolis force, the result is a significant susceptibility to interference. Furthermore, a linear acceleration along the detection direction also leads to an unwanted deflection of the partial oscillator.

Rotation-rate sensors are also known where a plurality of two-mass systems are connected by springs to permit detection of rotation rates in more than one direction. The increased complexity of the sensor design required for that purpose makes the rotation-rate sensor more prone to interference modes and, therefore, impedes the process of correlating the measured capacitances with the rotation rates.

SUMMARY OF THE INVENTION

It is therefore an object of the present invention to provide a rotation-rate sensor that does not have the related art disadvantages and is, nevertheless, compact, particularly in the case of a multi-channel rotation-rate sensor.

The objective may be achieved by a rotation-rate sensor that includes four seismic masses, the four seismic masses being divisible into a primary pair of seismic masses composed of a first primary mass and a second primary mass, and a secondary pair of seismic masses composed of a first secondary mass and a second secondary mass. It is provided in accordance with the present invention that both the primary pair, as well as the secondary pair be configured directly or indirectly on the substrate, which may be via springs in a way that allows all four seismic masses (i.e., the primary and secondary pair) to move (in particular, be driven) in a direction parallel to the main extension plane relative to the substrate. The primary pair essentially moves in each case in parallel along a primary deflection direction, and the secondary pair essentially in each case in parallel along a secondary deflection direction, the primary deflection direction and the secondary deflection direction extending orthogonally to one another. The present invention also provides that, on the one hand, the first and the second primary mass and, on the other hand, the first and the second secondary mass either move parallel or antiparallel to one another. On the one hand, the first and the second primary mass, respectively, on the other hand, the first and the second secondary mass may oscillate in phase opposition to one another, i.e., they move in essentially opposite directions. The present invention also provides that the primary pair and the secondary pair of seismic masses be driven in such a way that, in response to a rotation of the rotation-rate sensor, the Coriolis force leads to a deflection of the first primary mass and of the second primary mass and/or of the first secondary mass and of the second secondary mass. It is provided that the rotation-rate sensor be able to measure the rotation rate along at least one, which may be a plurality of directions. It is advantageous over the related art that the motion of the primary pair of seismic masses, respectively of the secondary pair of seismic masses may be a drive motion, as well as a Coriolis motion, as well as a detection motion. Drive motions refer to all motions that take place when the rotation-rate sensor is not rotated, i.e., when there is no rotation rate. Coriolis motions are understood to be those motions that arise from the action of the Coriolis force, and detection motions, those whose motion is measured capacitively, which may be via electrodes, and which are thereby used for quantitatively determining the rotation rate. Since the primary and secondary pair of seismic masses move in mutually orthogonal directions, at least two rotation rates may be determined from the rotation-rate sensor accordingly, whose directions are likewise mutually orthogonal, because the seismic masses of the first and of the second pair of seismic masses are not only able to execute the drive motion in each case, but also the Coriolis motions. Here, the advantage is derived that a rotation-rate sensor, composed of only four seismic masses, may be produced in a very compact form and is able to simultaneously measure a plurality of rotation rates extending in different directions.

In an especially compact specific embodiment, the primary pair of seismic masses frames the secondary pair of seismic masses in the plane parallel to the main extension plane; i.e., the first primary mass and the second primary mass oppose one another, and the secondary pair of seismic masses is disposed between the first primary mass and the second primary mass.

In one especially specific embodiment, the first and the second primary mass are interconnected via two coupling elements, in particular two rocker-type coupling elements; the secondary pair of seismic masses being configured between both the first and the second primary mass, as well as between the two (rocker-type) coupling elements. It is also provided in this specific embodiment that the first and the second secondary mass be operatively connected via the (rocker-type) coupling elements and via the primary pair of seismic masses in a way that prevents the first and the second secondary mass from moving parallel (to one another) along the secondary spreading direction, respectively from being deflected. Rather, the coupling of the first and the second secondary masses via the rocker-type coupling element prevents, respectively blocks the deflection when the first and second secondary mass have the tendency to move in the same mutually parallel direction. Typically, therefore, external actions of force that would deflect the first and the second secondary mass in the secondary deflection direction (such as a linear acceleration along the secondary deflection direction and/or an angular acceleration oriented orthogonally to the main extension plane) may advantageously not lead to a spurious signal when the deflection of the secondary pair along the secondary deflection direction is provided as a detection motion. In addition, the coupling prevents the first and second primary mass from being able to move at the same time in the same direction.

One alternative specific embodiment provides that the primary pair of seismic masses execute the drive motion along the primary deflection direction and the Coriolis motion along a direction extending orthogonally to the primary deflection axis (and parallel to the main extension plane), and that the Coriolis motion induce the detection motion along the secondary deflection direction of the secondary pair of seismic masses (via a rocker-type coupling). Such a sensor makes it possible to determine a rotation rate that extends orthogonally to the main extension plane. A coupling of the primary pair and of the secondary pair via a rocker-type coupling element may then reduce the sensitivity of the rotation-rate sensor to linear accelerations and angular accelerations about an axis of rotation orthogonally to the main extension plane. (This means the signal contributions of those interference effects may be advantageously reduced whose actions of force on the secondary pair of seismic masses take place in a direction parallel to the secondary deflection direction.) On the one hand, the (rocker-type) coupling prevents a disturbing influencing of the detection motion of the secondary pair, and, on the other hand, the external action of force is not able to influence the Coriolis motion of the primary pair of the seismic masses (and thus the detection motion of the secondary pair of the seismic masses via the rocker-type coupling).

In another especially specific embodiment, the (rocker-type) coupling between the primary and secondary pair of seismic masses is utilized to realize a drive motion of the secondary pair of seismic masses. It is provided that the first and the second primary mass be excited to an antiparallel oscillation, which may be via drive electrodes. For its part, this antiparallel oscillation has the effect of driving the first and the second secondary mass via the coupling element, these two seismic masses likewise moving antiparallel to one another. This advantageously reduces the complexity of the drive and evaluation circuits of the rotation-rate sensor necessary for driving the seismic masses, since, otherwise, the primary pair of seismic masses and the secondary pair of seismic masses would each have to be individually driven.

Another specific embodiment provides that the secondary pair be driven via the coupling elements by the deflection movement of the primary pair to a deflection movement along the secondary deflection direction. It is provided both for the primary pair, as well as for the secondary pair of seismic masses that the detection motion take place along a direction extending orthogonally to the main extension plane. The detection arrangements may be electrodes that include the substrate and the seismic mass. Such a rotation-rate sensor is provided for determining rotation rates that extend parallel to the main extension plane. It is advantageously insensitive to interference effects whose action of force, such as linear accelerations and angular accelerations, takes place in a direction parallel to the main extension plane.

Another specific embodiment provides that the coupling elements be configured to allow the secondary pair of seismic masses to additionally execute a detection motion in a direction extending orthogonally to the secondary deflection direction and parallel to the main extension plane; i.e., the first and second secondary mass are movable in this direction. In this specific embodiment, the rotation-rate sensor may determine both rotation rates that extend parallel to the main extension plane, as well as those that extend orthogonally to the main extension plane, and is advantageously insensitive to interference effects whose action of force, in particular linear accelerations and angular accelerations, takes place in a direction extending parallel and orthogonally to the main extension plane.

Another advantageous specific embodiment provides that both the primary pair of seismic masses, as well as the secondary pair of seismic masses be exclusively connected via the coupling element to the substrate. This specific embodiment provides that as much freedom of movement as possible be made available to the seismic masses for the drive motion, the Coriolis motion, and the detection motion, since the freedom of movement thereof is not only restricted by the coupling via a spring to the substrate.

Another specific embodiment provides that the primary pair and/or the secondary pair include a detection mass. The detection mass may be configured to exclusively execute a detection motion. This advantageously enhances the insensitivity to disturbance accelerations.

BRIEF DESCRIPTION OF THE DRAWINGS

FIG. 1a shows a specific embodiment according to the present invention of a single-channel $\Omega z$ rotation-rate sensor, in particular showing the operating state without a rotation rate.

FIG. 1b shows a specific embodiment according to the present invention of a single-channel $\Omega z$ rotation-rate sensor, in particular showing the operating state with a rotation rate along a direction orthogonally to the main extension plane (z direction).

FIG. 2c shows a first specific embodiment according to the present invention of a two-channel $\Omega z$ rotation-rate sensor, in particular showing the operating state with a rotation rate along a second rotation-rate direction extending parallel to the main extension plane (x direction).

DETAILED DESCRIPTION

Figure 2A:
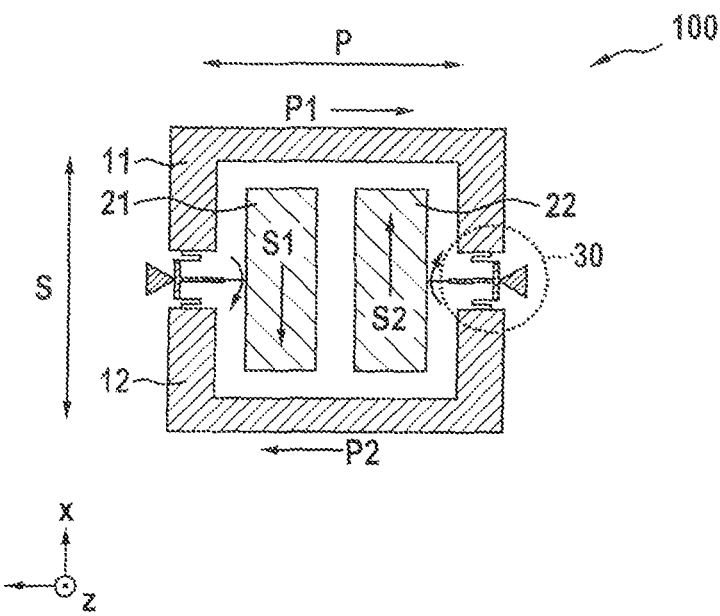
FIG. 2a shows a first specific embodiment according to the present invention of a two-channel $\Omega z$ rotation-rate sensor, in particular showing the operating state without a rotation rate.

In the various figures, the same parts are always denoted by the same reference numerals and, therefore, are also typically only named or mentioned once in each case.

FIG. 1 is a schematic view of a first specific embodiment of a Ωz rotation-rate sensor 100 according to the present invention in a schematic representation. This Ωz rotation-rate sensor is provided for measuring rotation rates that extend along the z direction (i.e., orthogonally to the main extension plane of the rotation-rate sensor). FIG. 1(a) shows the rotation-rate sensor in the operating state when no rotation rate is present in the z direction. The motions of one or of a plurality of seismic masses in this state are exclusively drive motions. The illustrated rotation-rate sensor includes a first primary mass 11 and a second primary mass 12 that oppose one another and, in this specific embodiment, function as Coriolis masses. Coriolis masses are understood to be those seismic masses that execute a Coriolis motion induced by the Coriolis force (in the illustrated operating state without a relevant rotation rate, no Coriolis force and thus also no Coriolis motion being present). First and second primary mass 11 and 12 are excited into oscillations via drive masses 2 (which are coupled via springs 9 to substrate 1 of the rotation-rate sensor) in a primary deflection direction P1, respectively P2 that extend parallel to the main extension plane. The rotation-rate sensor typically has comb-drive structures that control the motion of drive masses 2. It is provided that the deflection movement of first and second primary mass P1 and P2 take place in phase opposition, i.e., that the movements of first and second primary mass 11 and 12 be antiparallel (in opposite directions). As an example of a (rocker-type) coupling element, a rocker structure, respectively rocker 30 is configured at two locations between first and second primary mass 11 and 12. The individual rocker structure 30 is fixed to substrate 1 and features a rocker base 33 and a rocker bar 31. Rocker base 33 may also be a part of substrate 1. Rocker bar 31 is mounted on rocker base 33 in a way that allows rocker bar 31 to execute a rotational motion about an axis of rotation orthogonally to the main extension plane (referred to in the following as rocker motion). Rocker bar 31 is operatively connected via springs 32 both to first primary mass 11, as well as to second primary mass 12. The two rocker structures between first and second primary mass 11 and 12 are mounted relative to one another in a way that allows the rocker motions thereof to take place in a plane parallel to the main extension plane, and a first and a second secondary mass 21 and 22 to be configured between rocker structures 30. Moreover, a rocker structure is operatively connected to first secondary mass 21, and the other rocker structure to second secondary mass 22.

In the present specific embodiment, first and second secondary mass 21 and 22 are movable in a secondary deflection direction that extends orthogonally to the primary deflection direction and are coupled via further springs 8 to substrate 1. In the illustrated specific embodiment, they function as detection masses. This means that the motion thereof along the secondary deflection direction corresponds to a detection motion that is capacitively measured. To this end, a detection arrangement, which may be comb structures or electrodes, are configured in the region of secondary pair 21, 22 of the seismic mass. To achieve an especially compact design of the rotation-rate sensor, it is advantageous to configure the secondary pair of seismic masses 21, 22 in a way that allows them to be surrounded/embraced by the primary pair of seismic masses. In the case of the illustrated rotation-rate sensor, primary pair 11, 12 nearly frames secondary pair 21, 22 in a plane extending parallel to the main extension plane.

In particular, first secondary mass 21 and second secondary mass 22 are operatively connected via the two rocker structures 30 and the primary pair of seismic masses 11, 12.

In particular, this operative connection prevents first secondary mass 21 and second secondary mass 22 from being able to move simultaneously in the same direction along the detection direction. In addition, the operative connection prevents the first primary mass and the second primary mass from being able to move simultaneously in the same direction.

In the illustrated operating state (without a rotation rate in the z direction), first and second primary mass 11 and 12 either move toward or away from one another. This prevents any rocker motion.

FIG. 1(b) shows the Ω rotation-rate sensor in the operating state when no rotation rate is present in the z direction. In this case, the Coriolis force acts on first and second primary mass 11 and 12. As a result, the driven motion of first and second primary mass 11 and 12 is superimposed (along the primary deflection direction) with a Coriolis motion P1 and P2* orthogonally to the primary deflection direction. Coriolis motion denotes that motion which is induced by the Coriolis force. Since first and second primary mass 11 and 12 are excited into an oscillation in an antiparallel mode (i.e., in phase opposition), the Coriolis motion of first primary mass P1* of Coriolis motion of second primary mass P2* is likewise oppositely directed. This supports the rocker motion. In response to the rocker motion, rocker structure 30 transmits the rotary motion thereof to first, respectively second secondary mass 21, respectively 22, whereby the first (respectively, second secondary mass) is deflected along a secondary deflection direction S1* or S2*, the secondary deflection direction extending orthogonally to the primary deflection direction (i.e., the rotary motion of the rocker structure is transmitted to a translational motion of first, respectively second secondary mass 21, respectively 22). In the present specific embodiment, the rocker motions of the two rocker structures are oppositely oriented (i.e., the rotational motion of the one rocker structure is clockwise, while the other rotational motion is counterclockwise). The result is that first and second secondary mass 21 and 22 move past one another in opposite directions.

The advantage of this configuration is that, in response to the action of an angular acceleration about the z axis, neither the drive motions nor the detection motion are/is influenced in a way that causes the angular acceleration to essentially not contribute to the detection signal. In response to an angular acceleration about the z direction, a unidirectional force, whose direction extends parallel to first primary deflection direction P1, P2, respectively to detection direction S1*, S2*, is exerted on all four seismic masses. Thus, on the one hand, it is not possible for any Coriolis motion of first and second primary axis 11 and 12 to be induced (which, in turn, then allows first and second secondary mass 21 and 22 to move in the detection direction as a function of the rocker motion). On the other hand, in the case of a linear acceleration, rocker structure 30 prevents first and second primary mass 11 and 12, respectively first and second secondary mass 21 and 22 from being able to move simultaneously in the same direction.

Rotation-rate sensors 100 illustrated in the following FIG. 2 through 4 differ from the rotation-rate sensor of FIG. 1 essentially in that both primary pair 11, 12 of seismic masses, as well as the secondary pair of seismic masses 21, 22 at the same time constitute the drive mass, the Coriolis mass and the detection mass. For that reason, there is typically no further need for an additional drive mass, so that it is not included in the following figures.

Essentially, however, the rotation-rate sensors from the following figures have the same features as the rotation-rate sensor of FIG. 1. Therefore, the features that were already described with reference to FIG. 1 are omitted or are presented in simplified terms.

FIG. 2 shows a specific embodiment of a two-channel Ωxy rotation-rate sensor according to the present invention in a schematic view. This Ωxy rotation-rate sensor is provided for measuring rotation rates that extend along the x direction and the y axis (i.e., parallel to the main extension plane of the rotation-rate sensor). FIG. 2(a) shows the rotation-rate sensor in the operating state when there is neither a rotation rate in the y direction nor in the x direction. This specific embodiment provides that both the primary pair of seismic masses, as well as the secondary pair of seismic masses execute a drive motion. The first and the second primary mass are deflected in this instance in such a way that antiparallel oscillatory motion (P1 and P2) thereof induces a rocker motion in both rocker structures which together, in turn, allow the first and second secondary mass to oscillate in phase opposition along secondary deflection direction (S1 and S2).

Figure 2B:
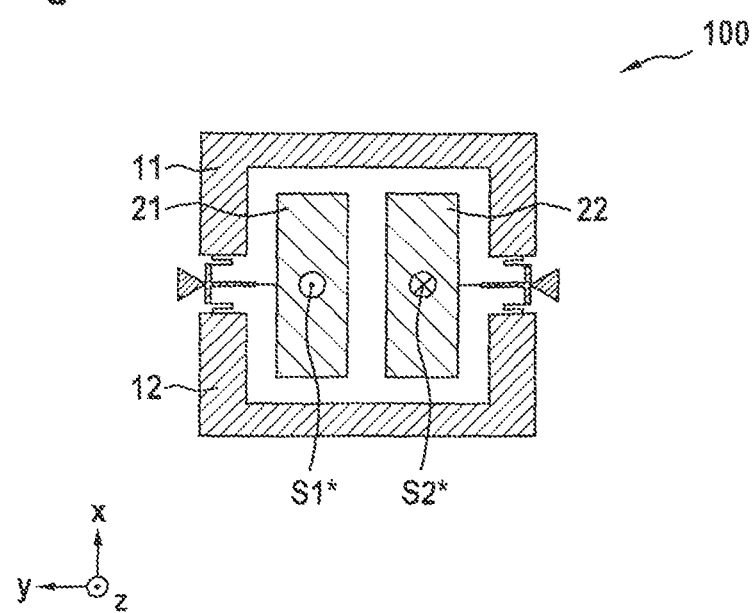
FIG. 2b shows a first specific embodiment according to the present invention of a two-channel $\Omega z$ rotation-rate sensor, in particular showing the operating state with a rotation rate along a first rotation-rate direction extending parallel to the main extension plane (y direction).
Figure 3A:
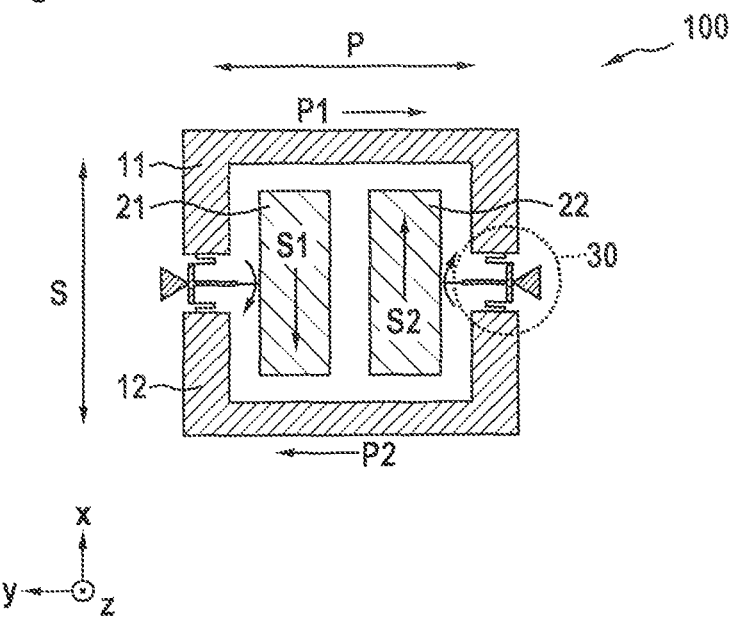
FIG. 3a shows a first specific embodiment according to the present invention of a three-channel $\Omega xyz$ rotation-rate sensor, in particular showing the operating state without a rotation rate.
Figure 3B:
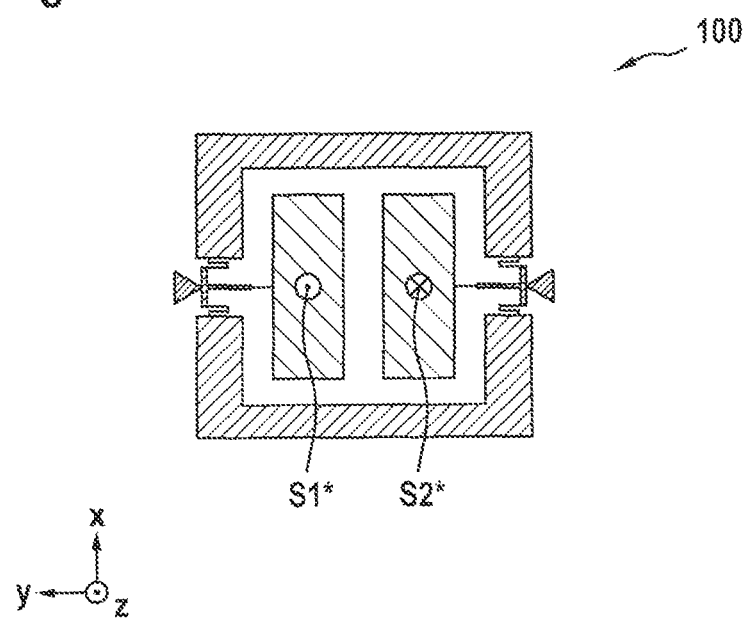
FIG. 3b shows a first specific embodiment according to the present invention of a three-channel $\Omega xyz$ rotation-rate sensor, in particular showing the operating state with a rotation rate along a first rotation-rate direction extending parallel to the main extension plane (y direction).
Figure 3C:
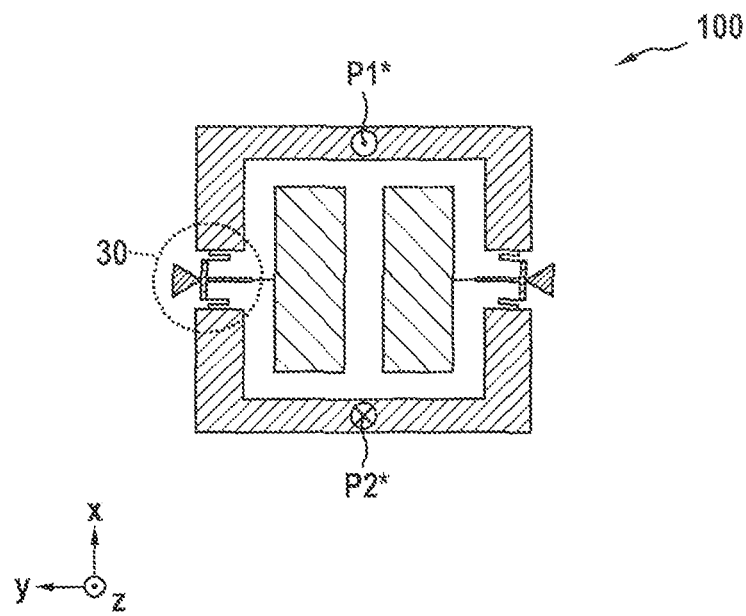
FIG. 3c shows a first specific embodiment according to the present invention of a three-channel Ωxyz rotation-rate sensor, in particular showing the operating state with a rotation rate along a second rotation-rate direction extending parallel to the main extension plane (x direction).
Figure 3D:
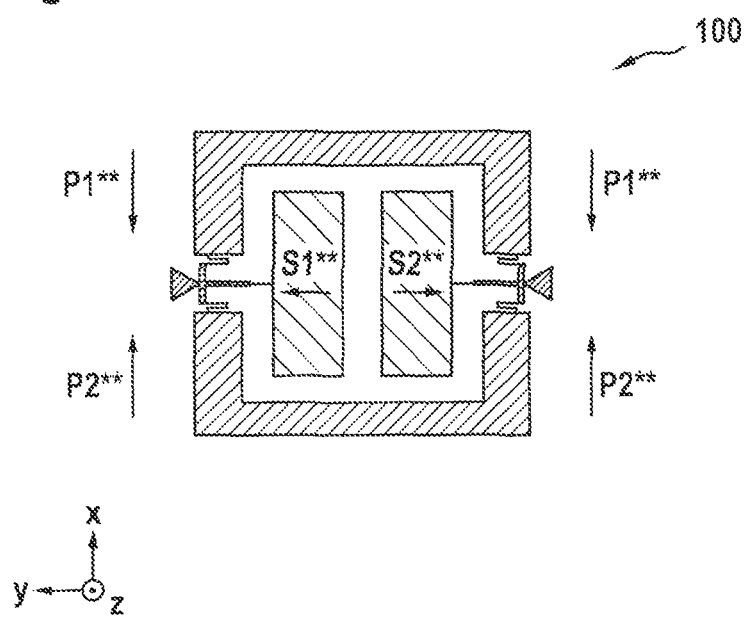
FIG. 3d shows a first specific embodiment according to the present invention of a three-channel Ωxyz rotation-rate sensor, in particular showing the operating state with a rotation rate along a direction extending orthogonally to the main extension plane (z direction).

FIG. 2(b) illustrates the Ωxy rotation-rate sensor from FIG. 2(a) in the operating state when a rotation rate is present in the y direction (i.e., parallel to the main extension plane and orthogonally to the secondary deflection direction). In this situation, the first and second secondary mass move orthogonally to the rotation rate in the y direction and in opposite directions. Thus, a Coriolis force acts thereon, resulting in a Coriolis motion of first and second secondary mass (S1* and S2*) in a direction extending orthogonally to the main extension plane; due to the antiparallel drive motion, the Coriolis forces acting in each case on the first and second secondary mass also being directed antiparallel to one another.

FIG. 2(c) shows the Ωxy rotation-rate sensor from FIG. 2(a) in the operating state when there is rotation rate present in the x direction (i.e., parallel to the main extension plane and to the secondary deflection direction). In this situation, the first and second primary mass move orthogonally to the rotation rate in the x direction. Thus, a Coriolis force acts thereon, and this results in a Coriolis motion of first and second primary mass (P1* and P2*) in a direction extending orthogonally to the main extension plane.

For such two-channel Ωxy rotation-rate sensors, it is provided that they at least include two detection arrangements, a first detection arrangement measuring the detection motion of first and secondary mass 12 and 22, and the second detection arrangement the detection motion of first and second primary mass 11 and 12.

A Ωxy rotation-rate sensor, as described in FIG. 2(a)-(c), has the advantage of being insensitive to linear accelerations and angular accelerations whose action of force takes place in a direction parallel to the main extension plane, since detection motions are observable/measurable exclusively in the z direction (and thus motions parallel to the main extension plane are not observable). Another advantage of this configuration is that the secondary pair of seismic masses 21, 22 is driven via primary pair 11, 12 (with the aid of the rocker structure). This advantageously makes it possible to reduce the complexity of the electronic drive and evaluation circuit.

FIG. 3 shows a first specific embodiment of a three-channel Ωxyz rotation-rate sensor according to the present invention in a schematic view. This Ωxyz rotation-rate sensor is provided for measuring rotation rates that extend along the x direction, the y axis, and the z axis (i.e., parallel and orthogonally to the main extension plane of the rotation-rate sensor). To determine the rotation rates in the x direction and in the y direction, the same configuration and the same operating principle are used that are known from the Ωxy rotation-rate sensor from FIG. 2. This is shown by FIGS. 3 (a)-(c). Besides the two-channel Ωxy rotation-rate sensor, the three-channel Ωxyz rotation-rate sensor of FIG. 3 also features a coupling system (not shown in the drawing) that makes it possible to move the first and the second secondary mass along another detection direction extending orthogonally to the secondary deflection direction when first primary mass 11 and second primary mass 12 move toward or away from one another parallel to the main extension plane. In response to a rotation rate in the z direction, the Coriolis force has the effect of moving first primary mass 11 and second primary mass 12 toward or away from one another orthogonally to the primary deflection direction (P1, P2), and thus first and second secondary mass (S1, S2) to move in the further detection direction.

For such a three-channel Ωxyz rotation-rate sensor, it is provided that it include at least three detection arrangements, a first detection arrangement measuring the detection motion of first and second secondary mass 21 and 22 in a detection direction extending orthogonally to the main extension plane; the second detection arrangement measuring the detection motion of the first and second primary mass 11 and 12; and the third detection arrangement measuring the detection motion of first and second secondary mass 21 and 22 in another detection direction (S1, S2) extending parallel to the main extension plane.

FIG. 4 shows a second specific embodiment of a three-channel Ωxyz rotation-rate sensor according to the present invention in a schematic view. This Ωxyz rotation-rate sensor is provided for measuring rotation rates that extend along the x direction, the y axis and the z axis (i.e., parallel and orthogonally to the main extension plane of the rotation-rate sensor). The three-channel Ωxyz rotation-rate sensor differs from that of FIG. 3 merely in that the secondary pair of seismic masses 21, 22 includes detection masses 6. Detection mass 6 is connected to secondary pair 21, 22 in a way that does not prevent the detection motion of first and second secondary mass 21 and 22 in a direction extending orthogonally to the main extension plane. Thus, the same operating principles in the context of the same operating states are derived in FIG. 4(a) through (c), as were presented correspondingly in FIG. 3 (a) through (c).

Figure 4A:
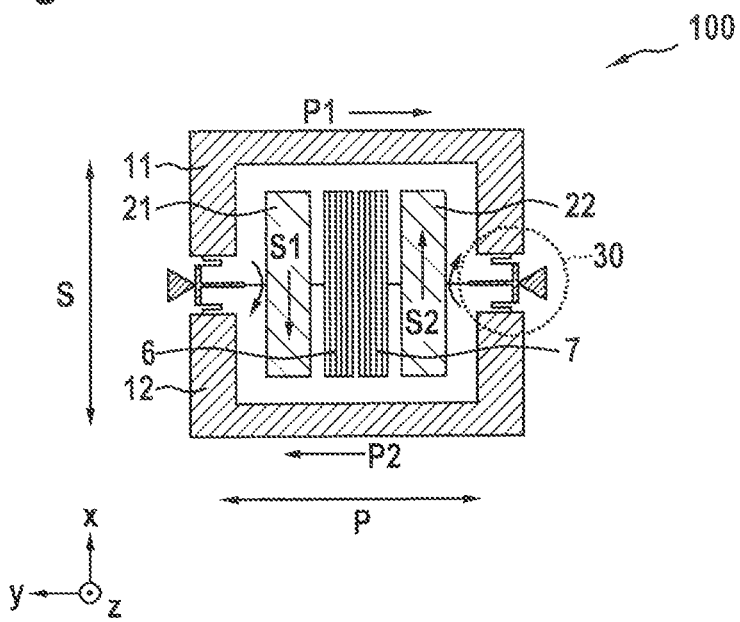
FIG. 4a shows a second specific embodiment according to the present invention of a three-channel Ωxyz rotation-rate sensor, in particular showing the operating state without a rotation rate.
Figure 4B:
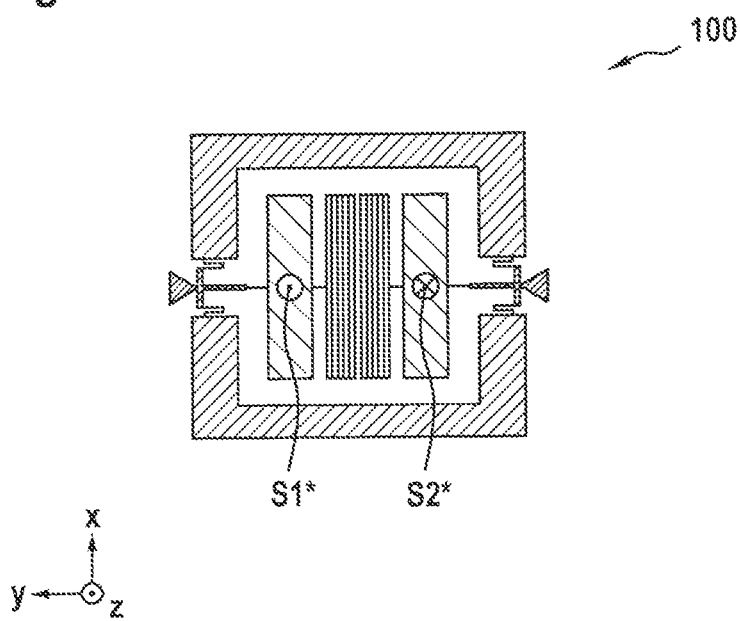
FIG. 4b shows a second specific embodiment according to the present invention of a three-channel Ωxyz rotation-rate sensor, in particular showing the operating state with a rotation rate along a first rotation-rate direction extending parallel to the main extension plane (y direction).
Figure 4C:
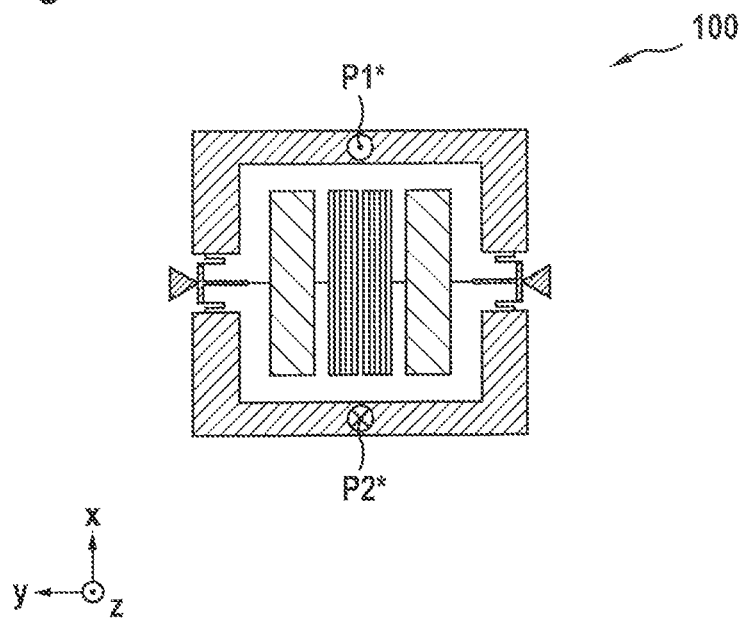
FIG. 4c shows a second specific embodiment according to the present invention of a three-channel Ωxyz rotation-rate sensor, in particular showing the operating state with a rotation rate along a second rotation-rate direction extending parallel to the main extension plane (x direction).
Figure 4D:
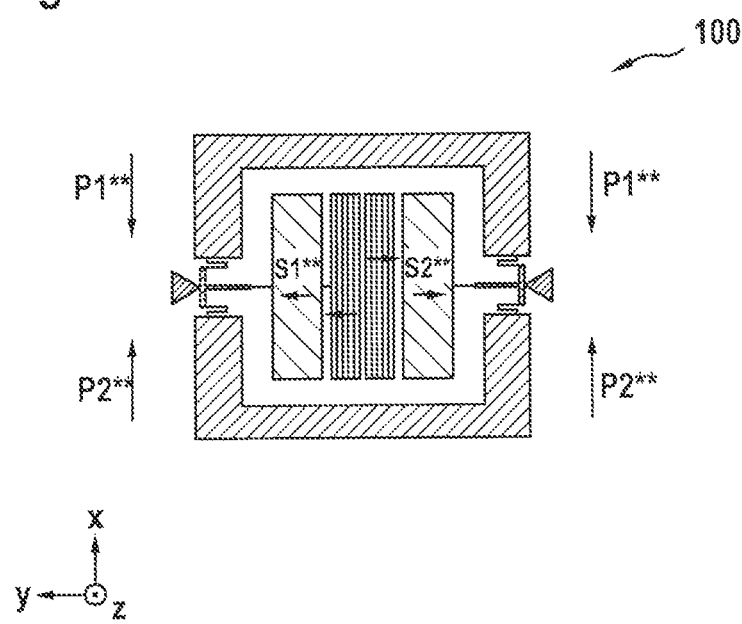
FIG. 4d shows a second specific embodiment according to the present invention of a three-channel Ωxyz rotation-rate sensor, in particular showing the operating state with a rotation rate along a direction extending orthogonally to the main extension plane (z direction).

In FIG. 4(d), first and second secondary mass 21 and 22 are each connected to a detection mass 6, particular detection mass 6 being able to move in a direction parallel to the main extension plane and orthogonally to the secondary deflection direction. In particular, the detection masses execute a detection motion when a Coriolis motion of the first and second secondary mass 21 and 22 takes place in response to a Coriolis force. This advantageously enhances the insensitivity to disturbance accelerations.

Figure 5:
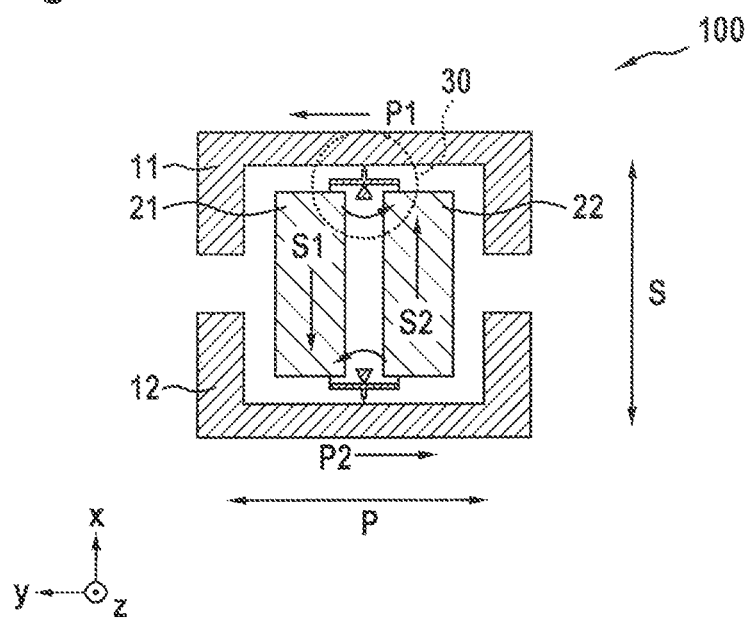
FIG. 5 shows a second specific embodiment according to the present invention of a two-channel Ωxy rotation-rate sensor in the operating state without a rotation rate.

FIG. 5 shows a specific embodiment of a two-channel Ωxy rotation-rate sensor according to the present invention in a schematic view. This Ωxy rotation-rate sensor is provided for measuring rotation rates that extend along the x direction and the y axis (i.e., parallel to the main extension plane of the rotation-rate sensor). FIG. 5(a) shows the rotation-rate sensor in the operating state when there is neither a rotation rate in the y direction nor in the x direction.

The illustrated rotation-rate sensor differs from the specific embodiment described in FIG. 2 in that rocker structures 30 are mounted at other locations. The drive motions of individual masses (P1, P2, S1 and S2), as well as detection motion thereof extend in the same directions both in the operating state without a rotation rate, as well as in the operating state with a rotation rate.

In this specific embodiment as well, the coupling elements may transmit the drive motion of the primary pair to the drive motion of the second pair. It is advantageous in this specific embodiment that the rocker structures/coupling elements connected to substrate 3 are configured between first, respectively second primary mass 11, respectively 12, and the secondary pair of seismic masses 21, 22, whereby the rotation-rate sensor becomes even more compact in comparison to the specific embodiments from FIG. 1 through 4.

What is claimed is:

1. A rotation-rate sensor, comprising:
a substrate having a main extension plane, for detecting a rotation rate, the rotation rate extending in a direction parallel to the main extension plane or orthogonally to the main extension plane;
a primary pair of seismic masses having a first primary mass and a second primary mass, wherein the first primary mass has a first end and a second end opposite to its first end, and the second primary mass has a first end and a second end opposite to its second end, the first end of the first primary mass being connected to the first end of the second primary mass via a first coupling element, and the second end of the first primary mass being connected to the second end of the second primary mass at a second end via a second coupling element;
a secondary pair of seismic masses having a first secondary mass and a second secondary mass, both the first secondary mass and the second secondary mass being situated between the first primary mass and the second primary mass, and also between the first coupling element and the second coupling element, so that the first primary mass, the first coupling element, the second primary mass, and the second coupling element, together, surround the first secondary mass and the second secondary mass;
wherein the first primary mass and the second primary mass are each movable relative to the substrate parallel to a primary deflection direction that extends parallel to the main extension plane of the rotation-rate sensor,
wherein the first secondary mass and the second secondary mass are each movable relative to the substrate parallel to a secondary deflection direction that extends parallel to the main extension plane of the rotation-rate sensor,
wherein the first primary mass and the second primary mass, and the first secondary mass and the second secondary mass are movable either antiparallel or parallel to one another in accordance with the particular deflection direction,
wherein the primary deflection direction essentially extends orthogonally to the secondary deflection direction,
wherein the primary pair of seismic masses and/or the secondary pair of seismic masses are drivable so that, in response to a rotation of the rotation-rate sensor, a Coriolis force leads to a deflection of the first primary mass and of the second primary mass and/or of the first secondary mass and of the second secondary mass.

2. The rotation-rate sensor of claim 1, wherein the first primary mass is connected to the second secondary mass via the first coupling element and the second coupling element so that a primary drive motion of the first primary mass induced by the drive arrangement and of the second primary mass leads to a secondary drive motion of the first secondary mass and of the second secondary mass, and so that a primary Coriolis motion of the first primary mass induced by Coriolis forces and of the second primary mass lead to the secondary drive motion of the first secondary mass and of the second secondary mass.

3. The rotation-rate sensor of claim 1, wherein each of the first coupling element and the second coupling element has a rocker structure.

4. The rotation-rate sensor of claim 1, wherein the primary pair of seismic masses, and the secondary pair of seismic masses are moved by the Coriolis force in a detection direction, the detection direction extending orthogonally to the main extension plane.

5. The rotation-rate sensor of claim 4, wherein the first secondary mass and the second secondary mass are movable in another detection direction, the other detection direction extending parallel to the main extension plane and orthogonally to the secondary deflection direction.

6. The rotation-rate sensor of claim 1, wherein the primary pair of seismic masses and the secondary pair of seismic masses are connected to the substrate via only the first coupling element and the second coupling element.

7. The rotation-rate sensor of claim 1, wherein the primary pair of seismic masses and/or the secondary pair of seismic masses includes a detection mass.

8. The rotation-rate sensor of claim 1, wherein the first coupling element is connected to the first secondary mass, and the second coupling element is connected to the second secondary mass.

9. The rotation-rate sensor of claim 8, wherein each of the first coupling element and the second coupling element has a rocker structure including a rocker base and a rocker bar, the rocker bar being mounted on the rocker base in such a way that the rocker bar executes a rotational motion about an axis of rotation orthogonal to the main extension plane.

10. The rotation-rate sensor of claim 9, wherein the rocker bar of the first coupling element is connected to the first end of the first primary mass and the first end of the second primary mass via springs, and the rocker bar of the second coupling element is connected to the second end of the first primary mass and the second end of the second primary mass via springs.

11. The rotation-rate sensor of claim 9, wherein the first coupling element is connected to the first secondary mass, and the second coupling element is connected to the second secondary mass.

12. The rotation-rate sensor of claim 1, wherein the first primary mass, the first coupling element, the second primary mass, and the second coupling element, together, surround the first secondary mass and the second secondary mass, together, surround the first secondary mass and the second secondary mass in a plane extending parallel to the main extension plane.

13. The rotation-rate sensor of claim 1, wherein the first secondary mass and the second secondary mass are coupled to the substrate via springs.

\* \* \* \* \*